US012075272B2

(12) United States Patent
Xu et al.

(10) Patent No.: US 12,075,272 B2
(45) Date of Patent: Aug. 27, 2024

(54) TECHNIQUES FOR CLI MEASUREMENT BASED ON ENHANCED SRS IN A WIRELESS COMMUNICATION SYSTEM

(71) Applicant: QUALCOMM Incorporated, San Diego, CA (US)

(72) Inventors: Huilin Xu, San Diego, CA (US); Alexandros Manolakos, San Diego, CA (US); Sony Akkarakaran, Poway, CA (US)

(73) Assignee: QUALCOMM Incorporated, San Diego, CA (US)

( * ) Notice: Subject to any disclaimer, the term of this patent is extended or adjusted under 35 U.S.C. 154(b) by 0 days.

(21) Appl. No.: 17/024,335

(22) Filed: Sep. 17, 2020

(65) Prior Publication Data
US 2021/0337411 A1 Oct. 28, 2021

(30) Foreign Application Priority Data

Apr. 24, 2020 (GR) ............................... 20200100209

(51) Int. Cl.
H04W 24/10 (2009.01)
H04B 17/318 (2015.01)
(Continued)

(52) U.S. Cl.
CPC .......... *H04W 24/10* (2013.01); *H04B 17/318* (2015.01); *H04B 17/336* (2015.01);
(Continued)

(58) Field of Classification Search
CPC ................. H04L 5/0092; H04L 5/0051; H04L 5/0048; H04L 5/0064; H04L 5/1469;
(Continued)

(56) References Cited

U.S. PATENT DOCUMENTS 10,903,920 B2  1/2021  Azarian Yazdi et al.
2007/0070916 A1* 3/2007  Lehane ................... H04L 43/18
                                                          370/252
(Continued)

FOREIGN PATENT DOCUMENTS

| EP | 3567759 A1 | 11/2019 |
| IN | 201927050229 A | 12/2019 |
| WO | 2018204098 | 11/2018 |
| WO | 2018228583 A1 | 12/2018 |
| WO | 2019032031 A1 | 2/2019 |

OTHER PUBLICATIONS

International Search Report and Written Opinion—PCT/US2021/023125—ISA/EPO—Jun. 22, 2021.

*Primary Examiner* — Un C Cho
*Assistant Examiner* — Rasha K Fayed
(74) *Attorney, Agent, or Firm* — Paul M. McAdams

(57) ABSTRACT

Aspects described herein relate to cross-link interference (CLI) measurement based on enhanced sounding reference signal (SRS) in fifth generation new radio (5G NR). In an example, the aspects may include receiving, by a first user equipment (UE) from a network entity, a SRS configuration; measuring, by the first UE, CLI between the first UE and a second UE based on the SRS configuration; and transmitting, by the first UE to the network entity, a measurement report of the CLI measurement to trigger CLI management between the first UE and the second UE.

30 Claims, 9 Drawing Sheets

(51) Int. Cl.
*H04B 17/336* (2015.01)
*H04J 13/00* (2011.01)
*H04L 5/00* (2006.01)
*H04L 25/02* (2006.01)
*H04L 27/26* (2006.01)

(52) U.S. Cl.
CPC ........ *H04J 13/0062* (2013.01); *H04L 5/0051* (2013.01); *H04L 25/0226* (2013.01); *H04L 27/2605* (2013.01); *H04L 5/0007* (2013.01)

(58) Field of Classification Search
CPC ................. H04L 5/1438; H04L 5/0091; H04L 5/0035; H04L 5/0023; H04L 5/00; H04L 5/01; H04L 5/10; H04L 5/0073; H04L 5/0007; H04L 5/0094; H04L 5/0057; H04L 5/14; H04L 5/0012; H04L 5/0032; H04L 5/0044; H04L 1/0026; H04L 25/0226; H04L 27/2607; H04L 27/26025; H04L 27/2613; H04W 24/10; H04W 24/08; H04W 72/085; H04W 72/1231; H04W 72/12; H04W 72/082; H04W 72/0493; H04W 72/046; H04W 72/042; H04W 72/1273; H04W 72/1289; H04W 76/28; H04W 76/27; H04W 16/28; H04W 80/02; H04B 17/336; H04B 17/318; H04B 17/345; H04B 17/24; H04B 7/0456; H04B 7/024; H04B 7/02; H04B 7/0408; H04B 7/0626; H04B 7/0695; H04B 7/088; H04J 13/0062; H04J 11/003

See application file for complete search history.

(56) References Cited

U.S. PATENT DOCUMENTS

| | | | |
|---|---|---|---|
| 2014/0293879 A1* | 10/2014 | Chen | H04L 45/74 |
| | | | 370/328 |
| 2017/0359817 A1* | 12/2017 | Wittenmark | H04W 76/27 |
| 2017/0366377 A1* | 12/2017 | Papasakellariou | H04L 5/005 |
| 2018/0205427 A1* | 7/2018 | Ghosh | H04B 17/345 |
| 2018/0323916 A1 | 11/2018 | Yang et al. | |
| 2018/0367346 A1* | 12/2018 | Chen | H04B 17/345 |
| 2019/0313458 A1* | 10/2019 | Zeng | H04W 16/14 |
| 2019/0357224 A1* | 11/2019 | Li | H04L 5/0055 |
| 2020/0053661 A1* | 2/2020 | Yang | H04W 72/10 |
| 2020/0169435 A1* | 5/2020 | Kang | H04L 27/2607 |
| 2020/0177291 A1* | 6/2020 | Fei | H04W 24/10 |
| 2020/0213052 A1* | 7/2020 | Li | H04L 5/0048 |
| 2020/0228213 A1* | 7/2020 | Masal | H04W 72/082 |
| 2020/0259628 A1* | 8/2020 | Zhao | H04L 27/2605 |
| 2020/0266908 A1* | 8/2020 | Qian | H04B 17/336 |
| 2020/0351690 A1* | 11/2020 | Zhu | H04B 17/336 |
| 2020/0389805 A1* | 12/2020 | Kim | H04W 72/042 |
| 2020/0396760 A1* | 12/2020 | Yi | H04W 72/042 |
| 2021/0136696 A1* | 5/2021 | Burke | H04B 17/318 |
| 2021/0144574 A1* | 5/2021 | Jin | H04L 5/0035 |
| 2021/0266128 A1* | 8/2021 | Zhang | H04L 25/0226 |
| 2021/0289374 A1* | 9/2021 | Zhang | H04W 16/28 |
| 2021/0409152 A1* | 12/2021 | Zhang | H04L 1/0069 |
| 2022/0052890 A1* | 2/2022 | Shi | H04L 5/0048 |
| 2022/0116252 A1* | 4/2022 | Xiong | H04L 27/2607 |
| 2022/0124531 A1* | 4/2022 | Miao | H04W 24/10 |
| 2022/0158782 A1* | 5/2022 | Qi | H04W 56/0045 |
| 2022/0231808 A1* | 7/2022 | Oh | H04L 5/0048 |
| 2022/0263621 A1* | 8/2022 | Cha | G01S 1/0428 |
| 2022/0304031 A1* | 9/2022 | Hong | H04L 5/00 |

* cited by examiner

TECHNIQUES FOR CLI MEASUREMENT BASED ON ENHANCED SRS IN A WIRELESS COMMUNICATION SYSTEM

CROSS-REFERENCE TO RELATED APPLICATION(S)

The present application claims benefit of Greece Application No. 20200100209 entitled "TECHNIQUES FOR CLI MEASUREMENT BASED ON ENHANCED SRS IN A WIRELESS COMMUNICATION SYSTEM" filed Apr. 24, 2020, which is assigned to the assignee hereof and hereby expressly incorporated by reference herein.

BACKGROUND

Aspects of the present disclosure relate generally to wireless communication systems, and more particularly, to cross-link interference (CLI) measurement based on enhanced sounding reference signal (SRS) in a wireless communication system, such as fifth generation new radio (5G NR).

Wireless communication systems are widely deployed to provide various types of communication content such as voice, video, packet data, messaging, broadcast, and so on. These systems may be multiple-access systems capable of supporting communication with multiple users by sharing the available system resources (e.g., time, frequency, and power). Examples of such multiple-access systems include code-division multiple access (CDMA) systems, time-division multiple access (TDMA) systems, frequency-division multiple access (FDMA) systems, and orthogonal frequency-division multiple access (OFDMA) systems, and single-carrier frequency division multiple access (SC-FDMA) systems.

These multiple access technologies have been adopted in various telecommunication standards to provide a common protocol that enables different wireless devices to communicate on a municipal, national, regional, and even global level. For example, a fifth generation (5G) wireless communications technology (which can be referred to as NR) is envisaged to expand and support diverse usage scenarios and applications with respect to current mobile network generations. In an aspect, 5G communications technology can include: enhanced mobile broadband addressing human-centric use cases for access to multimedia content, services and data; ultra-reliable-low latency communications (URLLC) with certain specifications for latency and reliability; and massive machine type communications, which can allow a very large number of connected devices and transmission of a relatively low volume of non-delay-sensitive information.

For example, for various communications technology such as, but not limited to NR, some implementations may increase transmission speed and flexibility but also transmission complexity. Thus, improvements in wireless communication operations may be desired.

SUMMARY

The following presents a simplified summary of one or more aspects in order to provide a basic understanding of such aspects. This summary is not an extensive overview of all contemplated aspects, and is intended to neither identify key or critical elements of all aspects nor delineate the scope of any or all aspects. Its sole purpose is to present some concepts of one or more aspects in a simplified form as a prelude to the more detailed description that is presented later.

An example implementation includes a method of wireless communication, including receiving, by a first user equipment (UE) from a network entity, a sounding reference signal (SRS) configuration; measuring, by the first UE, cross-link interference (CLI) between the first UE and a second UE based on the SRS configuration; and transmitting, by the first UE to the network entity, a measurement report of the CLI measurement to trigger CLI management between the first UE and the second UE.

Another example implementation includes an apparatus for wireless communication, including a processor and a memory in communication with the processor. The memory stores instructions which, when executed by the processor, cause the processor to receive, by a first UE from a network entity, a SRS configuration; measure, by the first UE, CLI between the first UE and a second UE based on the SRS configuration; and transmit, by the first UE to the network entity, a measurement report of the CLI measurement to trigger CLI management between the first UE and the second UE.

Another example implementation includes an apparatus for wireless communication, including means for receiving, by a first UE from a network entity, a SRS configuration; measuring, by the first UE, CLI between the first UE and a second UE based on the SRS configuration; and transmitting, by the first UE to the network entity, a measurement report of the CLI measurement to trigger CLI management between the first UE and the second UE.

Another example implementation includes a non-statutory computer-readable medium storing instructions for wireless communication, executable by a processor to receive, by a first UE from a network entity, a SRS configuration; measure, by the first UE, CLI between the first UE and a second UE based on the SRS configuration; and transmit, by the first UE to the network entity, a measurement report of the CLI measurement to trigger CLI management between the first UE and the second UE.

Another example implementation includes a method of wireless communication, including transmitting, by a network entity to a first UE, a SRS configuration; receiving, by the network entity from the first UE, a measurement report of the CLI measurement between the first UE and a second UE; and performing, by the network entity, CLI management between the first UE and the second UE based on the CLI measurement.

Another example implementation includes an apparatus for wireless communication, including a processor and a memory in communication with the processor. The memory stores instructions which, when executed by the processor, cause the processor to transmit, by a network entity to a first UE, a SRS configuration; receive, by the network entity from the first UE, a measurement report of the CLI measurement between the first UE and a second UE; and perform, by the network entity, CLI management between the first UE and the second UE based on the CLI measurement.

Another example implementation includes an apparatus for wireless communication, including means for transmitting, by a network entity to a first UE, a SRS configuration; receiving, by the network entity from the first UE, a measurement report of the CLI measurement between the first UE and a second UE; and performing, by the network entity, CLI management between the first UE and the second UE based on the CLI measurement.

Another example implementation includes a non-statutory computer-readable medium storing instructions for wireless communication, executable by a processor to transmit, by a network entity to a first UE, a SRS configuration; receive, by the network entity from the first UE, a measurement report of the CLI measurement between the first UE and a second UE; and perform, by the network entity, CLI management between the first UE and the second UE based on the CLI measurement.

In a further example, an apparatus for wireless communication is provided that includes a transceiver, a memory configured to store instructions, and one or more processors communicatively coupled with the transceiver and the memory. The one or more processors are configured to execute the instructions to perform the operations of the methods described herein. In another aspect, an apparatus for wireless communication is provided that includes means for performing the operations of methods described herein. In yet another aspect, a non-transitory computer-readable medium is provided including code executable by one or more processors to perform the operations of the methods described herein.

To the accomplishment of the foregoing and related ends, the one or more aspects comprise the features hereinafter fully described and particularly pointed out in the claims. The following description and the annexed drawings set forth in detail certain illustrative features of the one or more aspects. These features are indicative, however, of but a few of the various ways in which the principles of various aspects may be employed, and this description is intended to include all such aspects and their equivalents.

BRIEF DESCRIPTION OF THE DRAWINGS

The disclosed aspects will hereinafter be described in conjunction with the appended drawings, provided to illustrate and not to limit the disclosed aspects, wherein like designations denote like elements, and in which.

DETAILED DESCRIPTION

Figure 1:
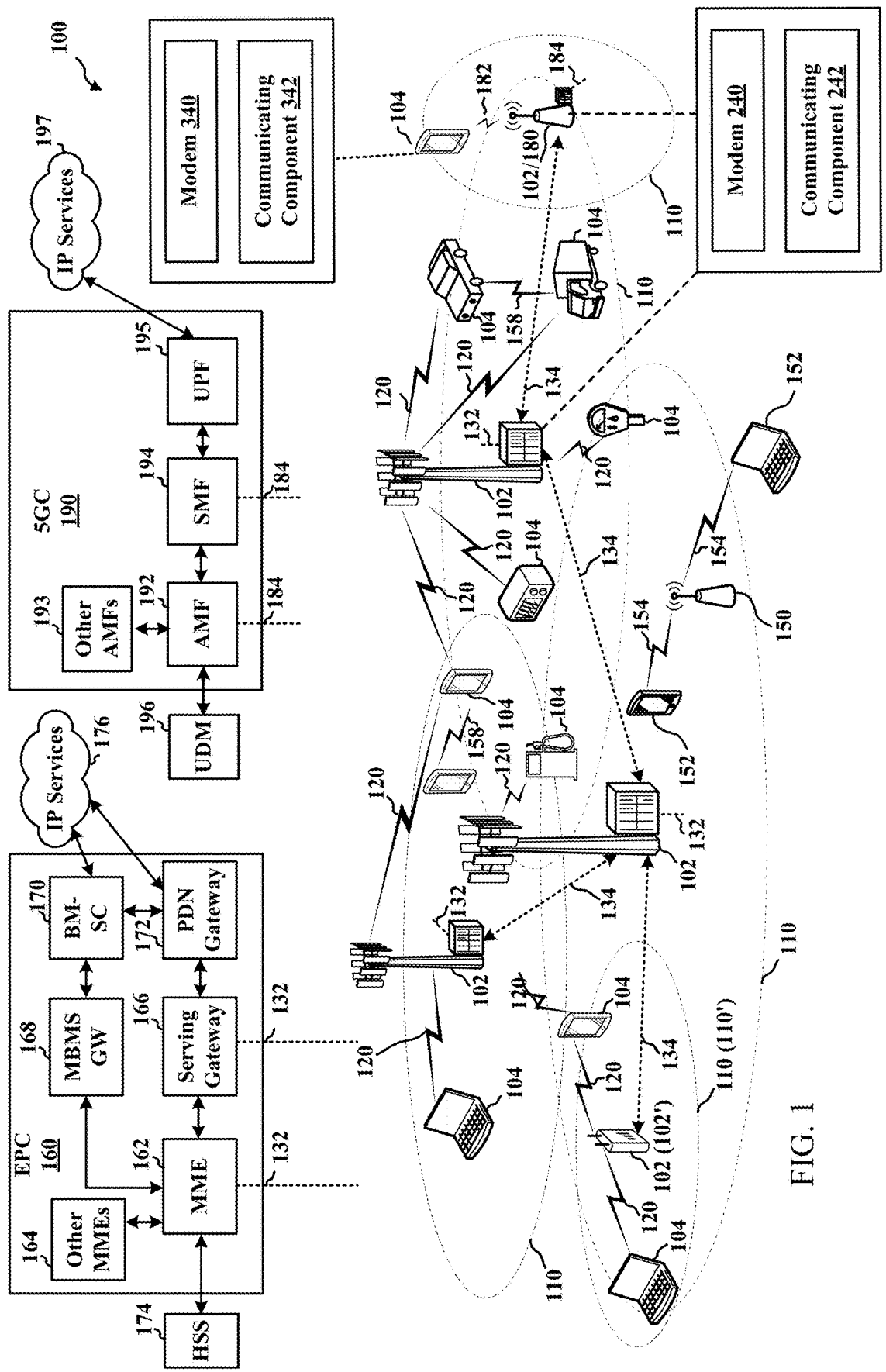
FIG. 1 is a schematic diagram of an example of a wireless communication system, in accordance with various aspects of the present disclosure.

Various aspects are now described with reference to the drawings. In the following description, for purposes of explanation, numerous specific details are set forth in order to provide a thorough understanding of one or more aspects. It may be evident, however, that such aspect(s) may be practiced without these specific details.

The described features generally relate to cross-link interference (CLI) measurement based on enhanced sounding reference signal (SRS) in a wireless communication system, such as fifth generation new radio (5G NR, or referred to as NR). For example, a first user equipment (UE) may experience CLI from a second UE when the second UE is near to the first UE. In this example, if the first UE and the second UE have different uplink (UL)-downlink (DL) slot formats, the first UE (e.g., victim UE) may receive UL transmissions from the second UE (e.g., the aggressor UE). Accordingly, CLI occurs within an UL symbol (i.e., interfering symbol) of the second UE collides within a DL symbol of the first UE.

The present disclosure relates generally to current issues of CLI measurement. In an aspect, the present disclosure includes a method, apparatus, and non-transitory computer readable medium for wireless communications for receiving, by a first UE from a network entity, a SRS configuration; measuring, by the first UE, CLI between the first UE and a second UE based on the SRS configuration; and transmitting, by the first UE to the network entity, a measurement report of the CLI measurement to trigger CLI management between the first UE and the second UE.

In another aspect, the present disclosure includes a method, apparatus, and non-transitory computer readable medium for wireless communications for transmitting, by a network entity to a first UE, a SRS configuration; receiving, by the network entity from the first UE, a measurement report of the CLI measurement between the first UE and a second UE; and performing, by the network entity, CLI management between the first UE and the second UE based on the CLI measurement.

The described features will be presented in more detail below with reference to FIGS. 1-9.

As used in this application, the terms "component," "module," "system" and the like are intended to include a computer-related entity, such as but not limited to hardware, software, a combination of hardware and software, or software in execution. For example, a component may be, but is not limited to being, a process running on a processor, a processor, an object, an executable, a thread of execution, a program, and/or a computer. By way of illustration, both an application running on a computing device and the computing device can be a component. One or more components can reside within a process and/or thread of execution and a component can be localized on one computer and/or distributed between two or more computers. In addition, these components can execute from various computer readable media having various data structures stored thereon. The components can communicate by way of local and/or remote processes such as in accordance with a signal having one or more data packets, such as data from one component interacting with another component in a local system, distributed system, and/or across a network such as the Internet with other systems by way of the signal. Software shall be construed broadly to mean instructions, instruction sets, code, code segments, program code, programs, subprograms, software modules, applications, software applications, software packages, routines, subroutines, objects, executables, threads of execution, procedures, functions, etc., whether referred to as software, firmware, middleware, microcode, hardware description language, or otherwise.

Techniques described herein may be used for various wireless communication systems such as CDMA, TDMA, FDMA, OFDMA, SC-FDMA, and other systems. The terms "system" and "network" may often be used interchangeably. A CDMA system may implement a radio technology such as CDMA2000, Universal Terrestrial Radio Access (UTRA), etc. CDMA2000 covers IS-2000, IS-95, and IS-856 standards. IS-2000 Releases 0 and A are commonly referred to as CDMA2000 1×, 1×, etc. IS-856 (TIA-856) is commonly referred to as CDMA2000 1×EV-DO, High Rate Packet Data (HRPD), etc. UTRA includes Wideband CDMA (WCDMA) and other variants of CDMA. A TDMA system may implement a radio technology such as Global System for Mobile Communications (GSM). An OFDMA system may implement a radio technology such as Ultra Mobile Broadband (UMB), Evolved UTRA (E-UTRA), IEEE 802.11 (Wi-Fi), IEEE 802.16 (WiMAX), IEEE 802.20, Flash-OFDM™, etc. UTRA and E-UTRA are part of Universal Mobile Telecommunication System (UMTS). 3GPP Long Term Evolution (LTE) and LTE-Advanced (LTE-A) are new releases of UMTS that use E-UTRA. UTRA, E-UTRA, UMTS, LTE, LTE-A, and GSM are described in documents from an organization named "3rd Generation Partnership Project" (3GPP). CDMA2000 and UMB are described in documents from an organization named "3rd Generation Partnership Project 2" (3GPP2). The techniques described herein may be used for the systems and radio technologies mentioned above as well as other systems and radio technologies, including cellular (e.g., LTE) communications over a shared radio frequency spectrum band. The description below, however, describes an LTE/LTE-A system for purposes of example, and LTE terminology is used in much of the description below, although the techniques are applicable beyond LTE/LTE-A applications (e.g., to fifth generation (5G) NR networks or other next generation communication systems).

The following description provides examples, and is not limiting of the scope, applicability, or examples set forth in the claims. Changes may be made in the function and arrangement of elements discussed without departing from the scope of the disclosure. Various examples may omit, substitute, or add various procedures or components as appropriate. For instance, the methods described may be performed in an order different from that described, and various steps may be added, omitted, or combined. Also, features described with respect to some examples may be combined in other examples.

Various aspects or features will be presented in terms of systems that can include a number of devices, components, modules, and the like. It is to be understood and appreciated that the various systems can include additional devices, components, modules, etc. and/or may not include all of the devices, components, modules etc. discussed in connection with the figures. A combination of these approaches can also be used.

Referring to FIG. 1, an example of a wireless communications system and an access network 100 (also referred to as a wireless wide area network (WWAN)) can include base stations 102, UEs 104, an Evolved Packet Core (EPC) 160, and/or a 5G Core (5GC) 190. The base stations 102, which may also be referred to as network entities, may include macro cells (high power cellular base station) and/or small cells (low power cellular base station). The macro cells can include base stations. The small cells can include femtocells, picocells, and microcells. In an example, the base stations 102 may also include gNBs 180, as described further herein.

In one example, some nodes such as base station 102/gNB 180, may have a modem 240 and a communicating component 242, as described herein. For example, base station 102 and/or communicating component 242 may transmit, to a first UE 104, a SRS configuration; receive, from the first UE 104, a measurement report of the CLI measurement between the first UE and a second UE; and perform CLI management between the first UE 104 and the second UE based on the CLI measurement. Though a base station 102/gNB 180 is shown as having the modem 240 and a communicating component 242, this is one illustrative example, and substantially any node may include a modem 240 and communicating component 242 for providing corresponding functionalities described herein.

In another example, some nodes such as UE 104 of the wireless communication system may have a modem 340 and communicating component 342 for receiving, from a base station 102 a SRS configuration; measuring CLI between the first UE and a second UE based on the SRS configuration; and transmitting, to the base station 102, a measurement report of the CLI measurement to trigger CLI management between the UE 104 and the second UE, as described herein. Though a UE 104 is shown as having the modem 340 and communicating component 342, this is one illustrative example, and substantially any node or type of node may include a modem 340 and communicating component 342 for providing corresponding functionalities described herein.

In an aspect, transmission of an enhanced SRS in an UL symbol by an aggressor UE(e.g., a second UE) that collides with a DL symbol of a victim UE (e.g., a first UE) may also cause CLI to the victim UE. This CLI may be caused by any UL transmission from aggressor UE including PUCCH, PUSCH, RACH preamble, and SRS. For example, the CLI may be measured based on RSSI. However, the RSSI may not be as accurate as RSRP measurements due to the difference between non-coherent and coherent processing. Accordingly, in order to accurately measure an SRS with enhancements that are not considered by a current CLI SRS-RSRP, the victim UE may need to be able to receive and demodulate the enhanced SRS in a receiver processor of the victim UE 104. In an example, the UE 104 may support additional SRS configurations as compared to conventional CLI SRS-RSRP measurement resources.

In an aspect, the additional SRS configurations may include one or more of the following SRS configurations. For example, a CLI SRS-RSRP measurement resource may be configured in any OFDM symbol of a slot instead of being limited to being measured only within the last 6 symbols of a slot. In another example, the SRS configuration may include a larger number of symbols per CLI SRS-RSRP measurement resource instead of being measured within 1, 2, or 4 symbols of a slot. In another example, the SRS configuration may include an additional comb size 8 for frequency domain mapping for a CLI SRS-RSRP measurement resource instead of being measured based on combination 2 and 4 only. Comb indicates that the SRS is transmitted in equally spaced subcarriers in frequency domain in a symbol like a comb. In this example, increasing the comb may result in more repetitions of a sequence in time domain. Therefore, the maximum number of supported cyclicShift values of the SRS configuration may be decreased accordingly to guarantee the orthogonality among sequences with different cyclicShift values. In another example, additional sequence IDs may be defined for CLI SRS-RSRP measurement resources. That is, more than 1024 sequence IDs may be configured for CLI SRS-RSRP measurements. In another example, a CLI SRS-RSRP measurement resource with multiple symbols in a slot may be staggered in frequency instead of the CLI SRS-RSRP being measured in the same set of resource elements (REs) in the same resource block (RB) across all symbols. In another example, a new sequence for CLI SRS-RSRP measurement resource may be based on pi/2 binary phase shift keying (BPSK) modulation or more Zadoff-Chu (ZC)-sequences (e.g., configured through the sequence generation parameters, i.e., μ and v, or different mapping of the sequence generation parameters across the OFDM symbols of an SRS resource.

In an aspect, a comb size 8 and corresponding cyclic shift may be configured to a CLI SRS-RSRP measurement resource based on:

| transmissionComb | n8 combOffset (0, . . . , 7), cyclicShift (0, . . . , 5) |
|---|---|

In an aspect, a starting OFDM symbol location for CLI SRS-RSRP measurement resource within a slot may be configured based on:

| startPosition | (0, . . . , 13) |
|---|---|

In an aspect, a larger number of 8 and 12 OFDM symbols within a slot per CLI SRS-RSRP measurement resource may be configured based on:

| nrofSymbols | {n1, n2, n4, n8, n12} |
|---|---|

In an aspect, a larger maximum number of sequence IDs for CLI SRS-RSRP measurement resources may be configured based on:

| sequenceId | (0, . . . , 65535) |
|---|---|

For example, the new larger limit may be defined for both existing SRS and enhanced SRS. In another example, the new larger limit may be defined only for the enhanced SRS.

In an aspect, a UE 104 and/or communicating component 342 may report in a capability signal to a base station 102 (e.g., a network entity) and/or communicating component 242 indicating whether the UE 104 supports the reception of CLI SRS-RSRP measurement resource by receiving and demodulating the enhanced SRS with the additional configurations. For example, the capability signal may include individual fields for each additional configuration. In another example, the capability may be signaled using a combination of a new capability field and existing fields. In this example, a single bit may indicate support of enhanced SRS. Further, the enhanced SRS is supported depends on other capabilities, such as, whether positioning is supported, whether downlink (DL) positioning reference signal (PRS) or uplink (UL) PRS (or both) are supported, or whether new radio unlicensed (NRU) is supported.

The base stations 102 configured for 4G LTE (which can collectively be referred to as Evolved Universal Mobile Telecommunications System (UMTS) Terrestrial Radio Access Network (E-UTRAN)) may interface with the EPC 160 through backhaul links 132 (e.g., using an S1 interface). The base stations 102 configured for 5G NR (which can collectively be referred to as Next Generation RAN (NG-RAN)) may interface with 5GC 190 through backhaul links 184. In addition to other functions, the base stations 102 may perform one or more of the following functions: transfer of user data, radio channel ciphering and deciphering, integrity protection, header compression, mobility control functions (e.g., handover, dual connectivity), inter-cell interference coordination, connection setup and release, load balancing, distribution for non-access stratum (NAS) messages, NAS node selection, synchronization, radio access network (RAN) sharing, multimedia broadcast multicast service (MBMS), subscriber and equipment trace, RAN information management (RIM), paging, positioning, and delivery of warning messages. The base stations 102 may communicate directly or indirectly (e.g., through the EPC 160 or 5GC 190) with each other over backhaul links 134 (e.g., using an X2 interface). The backhaul links 132, 134 and/or 184 may be wired or wireless.

The base stations 102 may wirelessly communicate with one or more UEs 104. Each of the base stations 102 may provide communication coverage for a respective geographic coverage area 110. There may be overlapping geographic coverage areas 110. For example, the small cell 102' may have a coverage area 110' that overlaps the coverage area 110 of one or more macro base stations 102. A network that includes both small cell and macro cells may be referred to as a heterogeneous network. A heterogeneous network may also include Home Evolved Node Bs (eNBs) (HeNBs), which may provide service to a restricted group, which can be referred to as a closed subscriber group (CSG). The communication links 120 between the base stations 102 and the UEs 104 may include uplink (UL) (also referred to as reverse link) transmissions from a UE 104 to a base station 102 and/or downlink (DL) (also referred to as forward link) transmissions from a base station 102 to a UE 104. The communication links 120 may use multiple-input and multiple-output (MIMO) antenna technology, including spatial multiplexing, beamforming, and/or transmit diversity. The communication links may be through one or more carriers. The base stations 102/UEs 104 may use spectrum up to Y MHz (e.g., 5, 10, 15, 20, 100, 400, etc. MHz) bandwidth per carrier allocated in a carrier aggregation of up to a total of Yx MHz (e.g., for x component carriers) used for transmission in the DL and/or the UL direction. The carriers may or may not be adjacent to each other. Allocation of carriers may be asymmetric with respect to DL and UL (e.g., more or less carriers may be allocated for DL than for UL). The component carriers may include a primary component carrier and one or more secondary component carriers. A primary component carrier may be referred to as a primary cell (PCell) and a secondary component carrier may be referred to as a secondary cell (SCell).

In another example, certain UEs 104 may communicate with each other using device-to-device (D2D) communication link 158. The D2D communication link 158 may use the DL/UL WWAN spectrum. The D2D communication link 158 may use one or more sidelink channels, such as a physical sidelink broadcast channel (PSBCH), a physical sidelink discovery channel (PSDCH), a physical sidelink shared channel (PSSCH), and a physical sidelink control channel (PSCCH). D2D communication may be through a variety of wireless D2D communications systems, such as for example, FlashLinQ, WiMedia, Bluetooth, ZigBee, Wi-Fi based on the IEEE 802.11 standard, LTE, or NR.

The wireless communications system may further include a Wi-Fi access point (AP) 150 in communication with Wi-Fi stations (STAs) 152 via communication links 154 in a 5 GHz unlicensed frequency spectrum. When communicating in an unlicensed frequency spectrum, the STAs 152/AP 150 may perform a clear channel assessment (CCA) prior to communicating in order to determine whether the channel is available.

The small cell 102' may operate in a licensed and/or an unlicensed frequency spectrum. When operating in an unlicensed frequency spectrum, the small cell 102' may employ NR and use the same 5 GHz unlicensed frequency spectrum as used by the Wi-Fi AP 150. The small cell 102', employing NR in an unlicensed frequency spectrum, may boost coverage to and/or increase capacity of the access network.

A base station 102, whether a small cell 102' or a large cell (e.g., macro base station), may include an eNB, gNodeB (gNB), or other type of base station. Some base stations, such as gNB 180 may operate in a traditional sub 6 GHz spectrum, in millimeter wave (mmW) frequencies, and/or near mmW frequencies in communication with the UE 104. When the gNB 180 operates in mmW or near mmW frequencies, the gNB 180 may be referred to as an mmW base station. Extremely high frequency (EHF) is part of the RF in the electromagnetic spectrum. EHF has a range of 30 GHz to 300 GHz and a wavelength between 1 millimeter and 10 millimeters. Radio waves in the band may be referred to as a millimeter wave. Near mmW may extend down to a frequency of 3 GHz with a wavelength of 100 millimeters. The super high frequency (SHF) band extends between 3 GHz and 30 GHz, also referred to as centimeter wave. Communications using the mmW/near mmW radio frequency band has extremely high path loss and a short range. The mmW base station 180 may utilize beamforming 182 with the UE 104 to compensate for the extremely high path loss and short range. A base station 102 referred to herein can include a gNB 180.

The EPC 160 may include a Mobility Management Entity (MME) 162, other MMES 164, a Serving Gateway 166, a Multimedia Broadcast Multicast Service (MBMS) Gateway 168, a Broadcast Multicast Service Center (BM-SC) 170, and a Packet Data Network (PDN) Gateway 172. The MME 162 may be in communication with a Home Subscriber Server (HSS) 174. The MME 162 is the control node that processes the signaling between the UEs 104 and the EPC 160. Generally, the MME 162 provides bearer and connection management. All user Internet protocol (IP) packets are transferred through the Serving Gateway 166, which itself is connected to the PDN Gateway 172. The PDN Gateway 172 provides UE IP address allocation as well as other functions. The PDN Gateway 172 and the BM-SC 170 are connected to the IP Services 176. The IP Services 176 may include the Internet, an intranet, an IP Multimedia Subsystem (IMS), a PS Streaming Service, and/or other IP services. The BM-SC 170 may provide functions for MBMS user service provisioning and delivery. The BM-SC 170 may serve as an entry point for content provider MBMS transmission, may be used to authorize and initiate MBMS Bearer Services within a public land mobile network (PLMN), and may be used to schedule MBMS transmissions. The MBMS Gateway 168 may be used to distribute MBMS traffic to the base stations 102 belonging to a Multicast Broadcast Single Frequency Network (MBSFN) area broadcasting a particular service, and may be responsible for session management (start/stop) and for collecting eMBMS related charging information.

The 5GC 190 may include a Access and Mobility Management Function (AMF) 192, other AMFs 193, a Session Management Function (SMF) 194, and a User Plane Function (UPF) 195. The AMF 192 may be in communication with a Unified Data Management (UDM) 196. The AMF 192 can be a control node that processes the signaling between the UEs 104 and the 5GC 190. Generally, the AMF 192 can provide QoS flow and session management. User Internet protocol (IP) packets (e.g., from one or more UEs 104) can be transferred through the UPF 195. The UPF 195 can provide UE IP address allocation for one or more UEs, as well as other functions. The UPF 195 is connected to the IP Services 197. The IP Services 197 may include the Internet, an intranet, an IP Multimedia Subsystem (IMS), a PS Streaming Service, and/or other IP services.

The base station may also be referred to as a gNB, Node B, evolved Node B (eNB), an access point, a base transceiver station, a radio base station, a radio transceiver, a transceiver function, a basic service set (BSS), an extended service set (ESS), a transmit reception point (TRP), or some other suitable terminology. The base station 102 provides an access point to the EPC 160 or 5GC 190 for a UE 104. Examples of UEs 104 include a cellular phone, a smart phone, a session initiation protocol (SIP) phone, a laptop, a personal digital assistant (PDA), a satellite radio, a positioning system (e.g., satellite, terrestrial), a multimedia device, a video device, a digital audio player (e.g., MP3 player), a camera, a game console, a tablet, a smart device, robots, drones, an industrial/manufacturing device, a wearable device (e.g., a smart watch, smart clothing, smart glasses, virtual reality goggles, a smart wristband, smart jewelry (e.g., a smart ring, a smart bracelet)), a vehicle/a vehicular device, a meter (e.g., parking meter, electric meter, gas meter, water meter, flow meter), a gas pump, a large or small kitchen appliance, a medical/healthcare device, an implant, a sensor/actuator, a display, or any other similar functioning device. Some of the UEs 104 may be referred to as IoT devices (e.g., meters, pumps, monitors, cameras, industrial/manufacturing devices, appliances, vehicles, robots, drones, etc.). IoT UEs may include MTC/enhanced MTC (eMTC, also referred to as CAT-M, Cat M1) UEs, NB-IoT (also referred to as CAT NB1) UEs, as well as other types of UEs. In the present disclosure, eMTC and NB-IoT may refer to future technologies that may evolve from or may be based on these technologies. For example, eMTC may include FeMTC (further eMTC), eFeMTC (enhanced further eMTC), mMTC (massive MTC), etc., and NB-IoT may include eNB-IoT (enhanced NB-IoT), FeNB-IoT (further enhanced NB-IoT), etc. The UE 104 may also be referred to as a station, a mobile station, a subscriber station, a mobile unit, a subscriber unit, a wireless unit, a remote unit, a mobile device, a wireless device, a wireless communications device, a remote device, a mobile subscriber station, an access terminal, a mobile terminal, a wireless terminal, a remote terminal, a handset, a user agent, a mobile client, a client, or some other suitable terminology.

Figure 5:
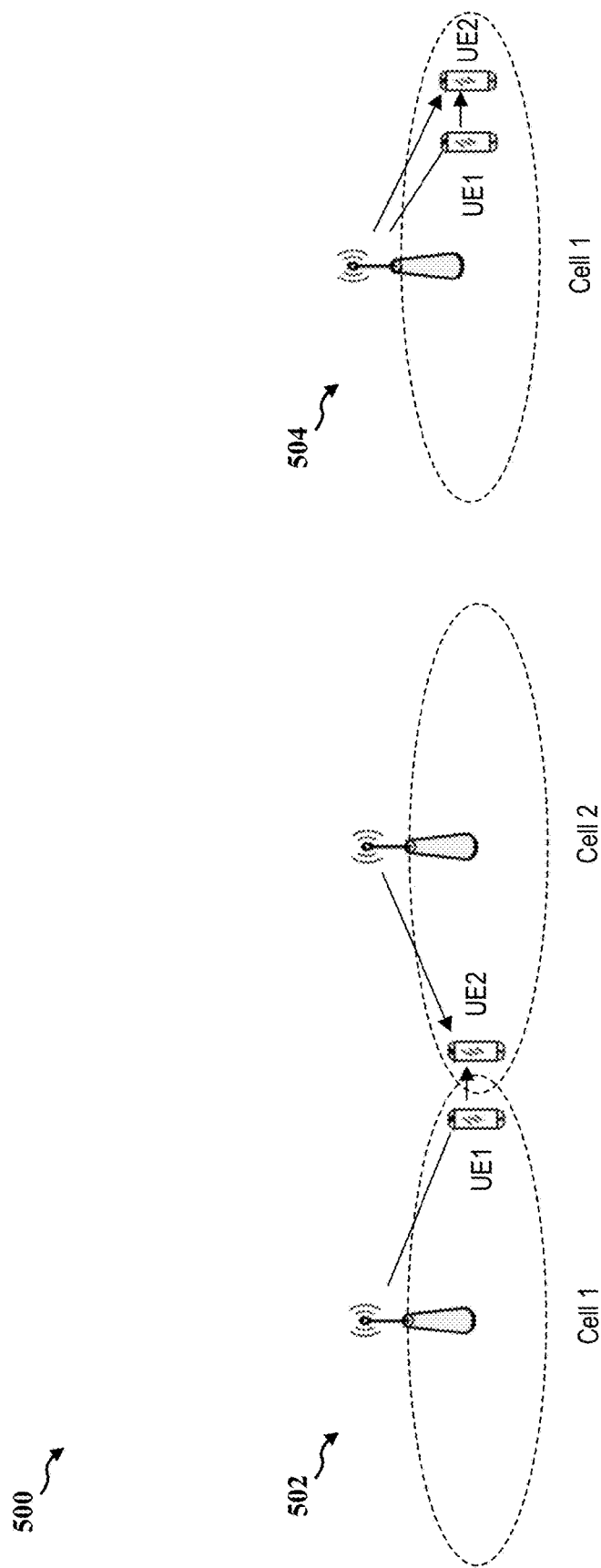
FIG. 5 is a diagram of an example of CLI between two UEs configured in a single cell or different cells, in accordance with various aspects of the present disclosure.
Figure 6:
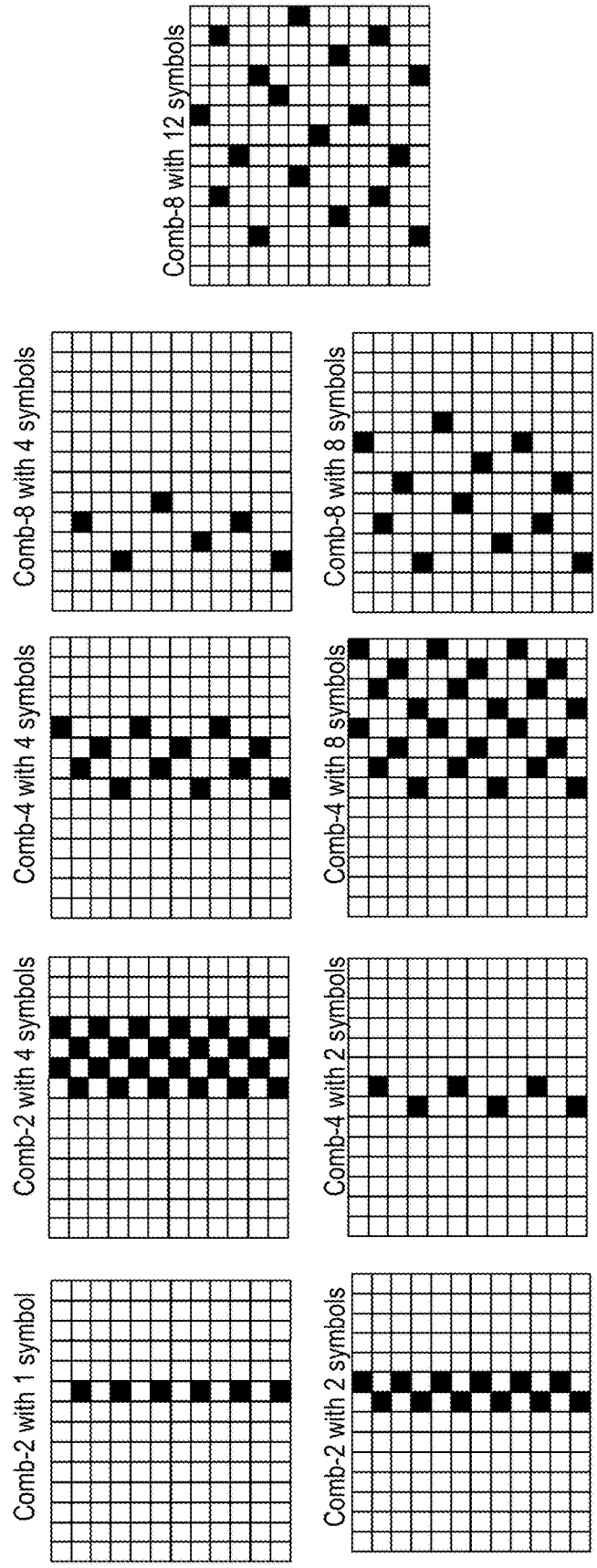
FIG. 6 is a diagram of a staggering pattern per comb size and a number of symbols, in accordance with various aspects of the present disclosure.
Figure 7:
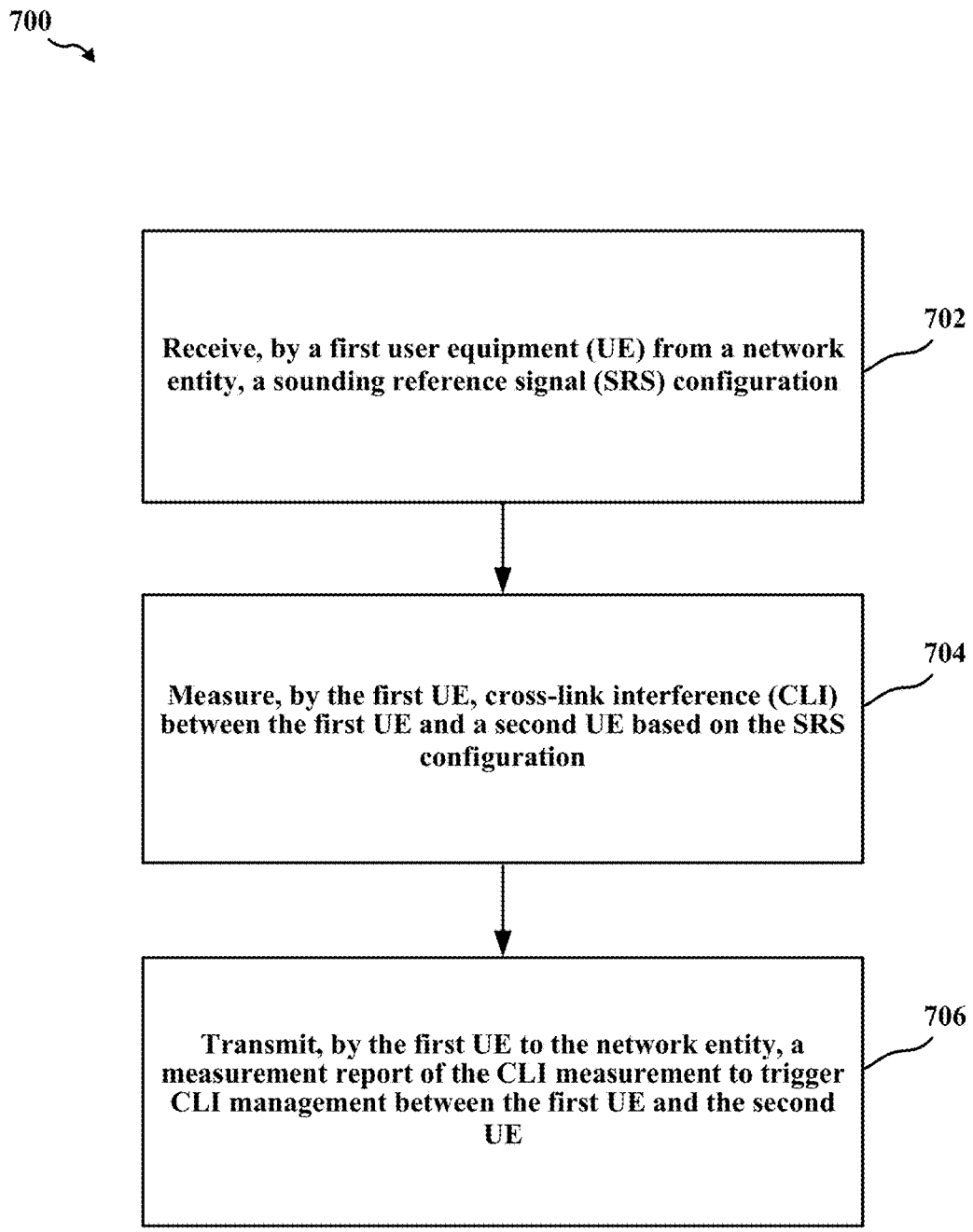
FIG. 7 is a flowchart of an example method of wireless communication, and more specifically, CLI measurement based on enhanced sounding reference signal (SRS) at a UE, in accordance with various aspects of the present disclosure.
Figure 8:
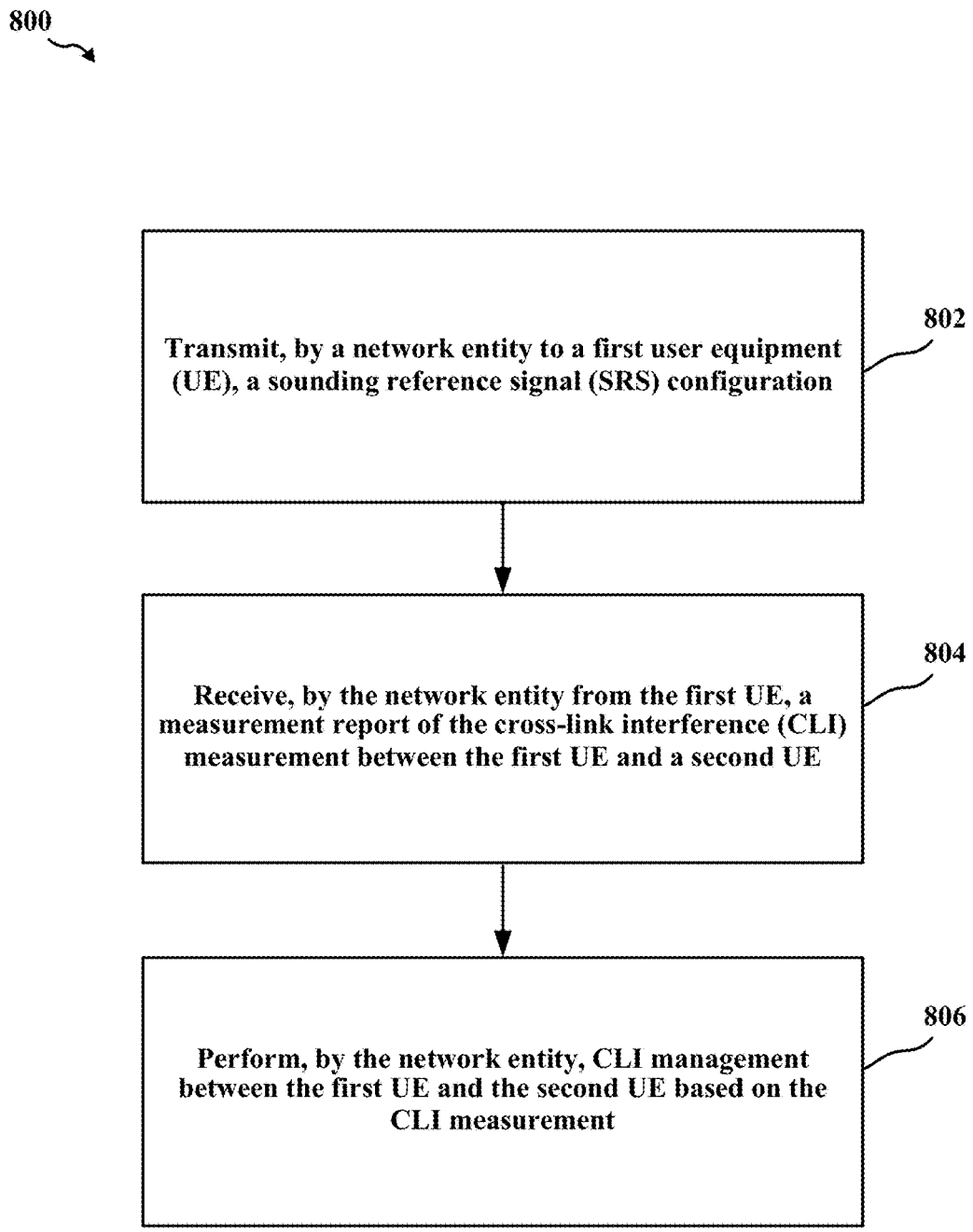
FIG. 8 is a flowchart of an example method of wireless communication, and more specifically, CLI measurement based on enhanced SRS at a network entity, in accordance with various aspects of the present disclosure.

Turning now to FIGS. 2-9, aspects are depicted with reference to one or more components and one or more methods that may perform the actions or operations described herein, where aspects in dashed line may be optional. Although the operations described below in FIGS. 7 and 8 are presented in a particular order and/or as being performed by an example component, it should be understood that the ordering of the actions and the components performing the actions may be varied, depending on the implementation. Moreover, it should be understood that the following actions, functions, and/or described components may be performed by a specially-programmed processor, a processor executing specially-programmed software or computer-readable media, or by any other combination of a hardware component and/or a software component capable of performing the described actions or functions.

Figure 2:
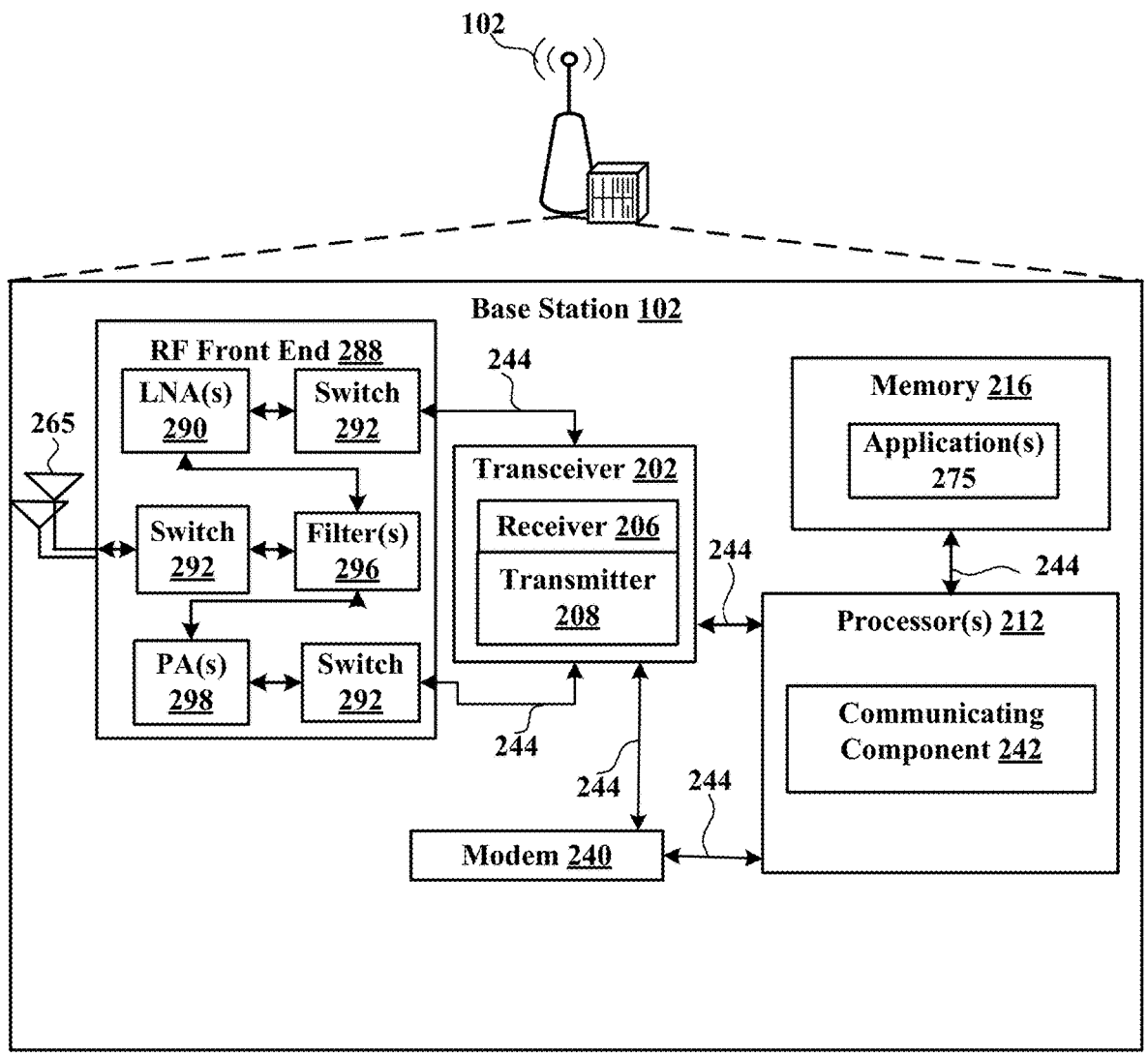
FIG. 2 is a block diagram of an example of a network entity in accordance with various aspects of the present disclosure.

Referring to FIG. 2, base station 102 (e.g., a base station 102 and/or gNB 180, as described above) may include a variety of components, some of which have already been described above and are described further herein, including components such as one or more processors 212 and memory 216 and transceiver 202 in communication via one or more buses 244, which may operate in conjunction with modem 240 and/or communicating component 242 for CLI measurement based on enhanced SRS.

In an aspect, the one or more processors 212 can include a modem 240 and/or can be part of the modem 240 that uses one or more modem processors. Thus, the various functions related to communicating component 242 may be included in modem 240 and/or processors 212 and, in an aspect, can be executed by a single processor, while in other aspects, different ones of the functions may be executed by a combination of two or more different processors. For example, in an aspect, the one or more processors 212 may include any one or any combination of a modem processor, or a baseband processor, or a digital signal processor, or a transmit processor, or a receiver processor, or a transceiver processor associated with transceiver 202. In other aspects, some of the features of the one or more processors 212 and/or modem 240 associated with communicating component 242 may be performed by transceiver 202.

Also, memory 216 may be configured to store data used herein and/or local versions of applications 275 or communicating component 242 and/or one or more of its subcomponents being executed by at least one processor 212. Memory 216 can include any type of computer-readable medium usable by a computer or at least one processor 212, such as random access memory (RAM), read only memory (ROM), tapes, magnetic discs, optical discs, volatile memory, non-volatile memory, and any combination thereof. In an aspect, for example, memory 216 may be a non-transitory computer-readable storage medium that stores one or more computer-executable codes defining communicating component 242 and/or one or more of its subcomponents, and/or data associated therewith, when base station 102 is operating at least one processor 212 to execute communicating component 242 and/or one or more of its subcomponents.

Transceiver 202 may include at least one receiver 206 and at least one transmitter 208. Receiver 206 may include hardware and/or software executable by a processor for receiving data, the code comprising instructions and being stored in a memory (e.g., computer-readable medium). Receiver 206 may be, for example, a radio frequency (RF) receiver. In an aspect, receiver 206 may receive signals transmitted by at least one base station 102. Additionally, receiver 206 may process such received signals, and also may obtain measurements of the signals, such as, but not limited to, Ec/Io, signal-to-noise ratio (SNR), reference signal received power (RSRP), received signal strength indicator (RSSI), etc. Transmitter 208 may include hardware and/or software executable by a processor for transmitting data, the code comprising instructions and being stored in a memory (e.g., computer-readable medium). A suitable example of transmitter 208 may including, but is not limited to, an RF transmitter.

Moreover, in an aspect, base station 102 may include RF front end 288, which may operate in communication with one or more antennas 265 and transceiver 202 for receiving and transmitting radio transmissions, for example, wireless communications transmitted by at least one base station 102 or wireless transmissions transmitted by UE 104. RF front end 288 may be connected to one or more antennas 265 and can include one or more low-noise amplifiers (LNAs) 290, one or more switches 292, one or more power amplifiers (PAs) 298, and one or more filters 296 for transmitting and receiving RF signals. The antennas 265 may include one or more antennas, antenna elements, and/or antenna arrays.

In an aspect, LNA 290 can amplify a received signal at a desired output level. In an aspect, each LNA 290 may have a specified minimum and maximum gain values. In an aspect, RF front end 288 may use one or more switches 292 to select a particular LNA 290 and its specified gain value based on a desired gain value for a particular application.

Further, for example, one or more PA(s) 298 may be used by RF front end 288 to amplify a signal for an RF output at a desired output power level. In an aspect, each PA 298 may have specified minimum and maximum gain values. In an aspect, RF front end 288 may use one or more switches 292 to select a particular PA 298 and its specified gain value based on a desired gain value for a particular application.

Also, for example, one or more filters 296 can be used by RF front end 288 to filter a received signal to obtain an input RF signal. Similarly, in an aspect, for example, a respective filter 296 can be used to filter an output from a respective PA 298 to produce an output signal for transmission. In an aspect, each filter 296 can be connected to a specific LNA 290 and/or PA 298. In an aspect, RF front end 288 can use one or more switches 292 to select a transmit or receive path using a specified filter 296, LNA 290, and/or PA 298, based on a configuration as specified by transceiver 202 and/or processor 212.

As such, transceiver 202 may be configured to transmit and receive wireless signals through one or more antennas 265 via RF front end 288. In an aspect, transceiver may be tuned to operate at specified frequencies such that UE 104 can communicate with, for example, one or more base stations 102 or one or more cells associated with one or more base stations 102. In an aspect, for example, modem 240 can configure transceiver 202 to operate at a specified frequency and power level based on the UE configuration of the UE 104 and the communication protocol used by modem 240.

In an aspect, modem 240 can be a multiband-multimode modem, which can process digital data and communicate with transceiver 202 such that the digital data is sent and received using transceiver 202. In an aspect, modem 240 can be multiband and be configured to support multiple frequency bands for a specific communications protocol. In an aspect, modem 240 can be multimode and be configured to support multiple operating networks and communications protocols. In an aspect, modem 240 can control one or more components of UE 104 (e.g., RF front end 288, transceiver 202) to enable transmission and/or reception of signals from the network based on a specified modem configuration. In an aspect, the modem configuration can be based on the mode of the modem and the frequency band in use. In another aspect, the modem configuration can be based on UE configuration information associated with UE 104 as provided by the network during cell selection and/or cell reselection.

In an aspect, the processor(s) 212 may correspond to one or more of the processors described in connection with the base station in FIG. 9. Similarly, the memory 216 may correspond to the memory described in connection with the base station in FIG. 9.

Figure 3:
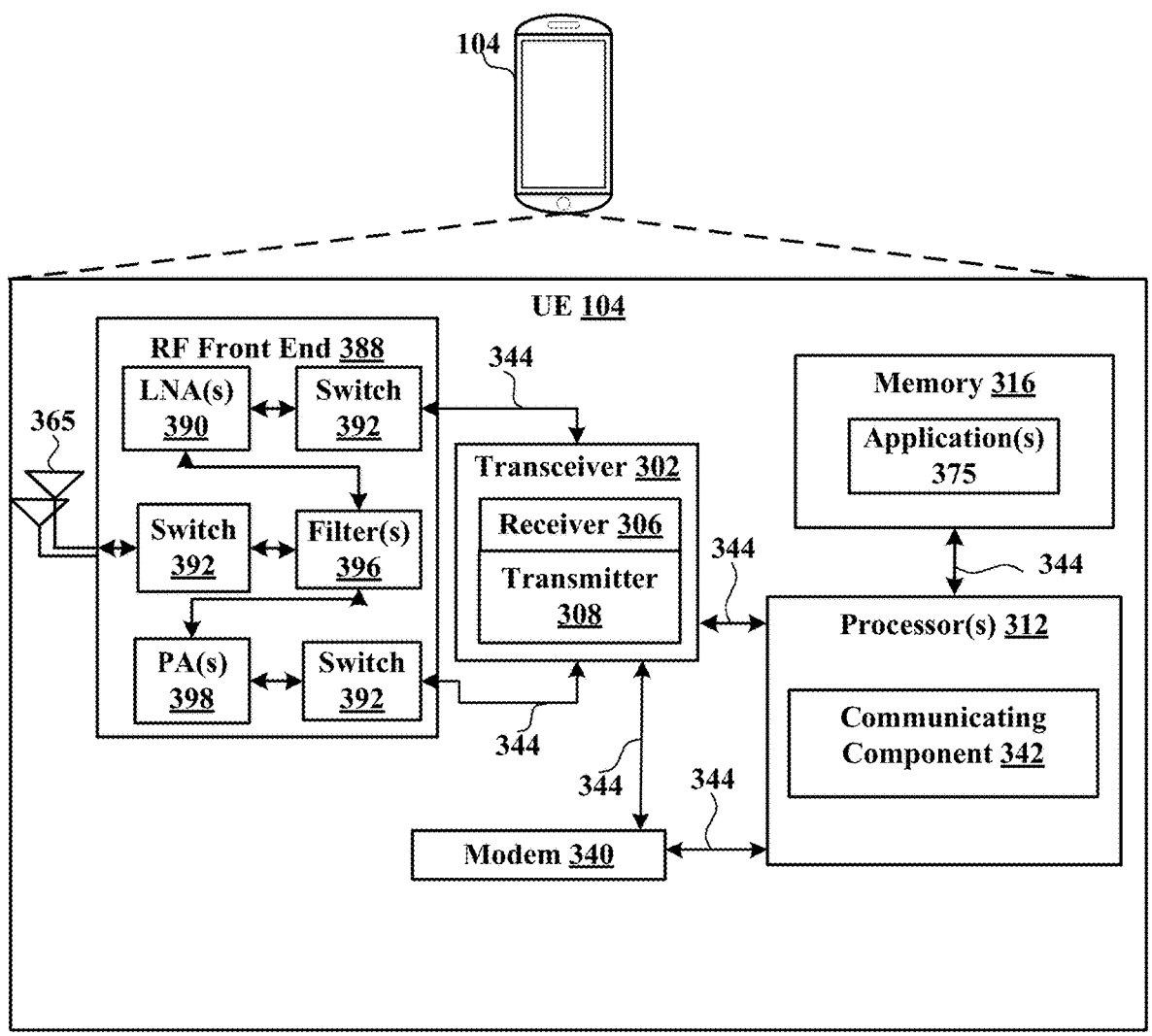
FIG. 3 is a block diagram of an example of a user equipment (UE), in accordance with various aspects of the present disclosure.

Referring to FIG. 3, one example of an implementation of UE 104 may include a variety of components, some of which have already been described above and are described further herein, including components such as one or more processors 312 and memory 316 and transceiver 302 in communication via one or more buses 344, which may operate in conjunction with modem 340. In an aspect, for example, memory 316 may be a non-transitory computer-readable storage medium that stores one or more computer-executable codes defining communicating component 342 and/or one or more of its subcomponents, and/or data associated therewith, when UE 104 is operating at least one processor 312 to execute communicating component 342 and/or one or more of its subcomponents for CLI measurement based on enhanced SRS.

The transceiver 302, receiver 306, transmitter 308, one or more processors 312, memory 316, applications 375, buses 344, RF front end 388, LNAs 390, switches 392, filters 396, PAs 398, and one or more antennas 365 may be the same as or similar to the corresponding components of base station 102, as described above, but configured or otherwise programmed for base station operations as opposed to base station operations.

In an aspect, the processor(s) 312 may correspond to one or more of the processors described in connection with the base station in FIG. 9. Similarly, the memory 316 may correspond to the memory described in connection with the base station in FIG. 9.

Figure 4:
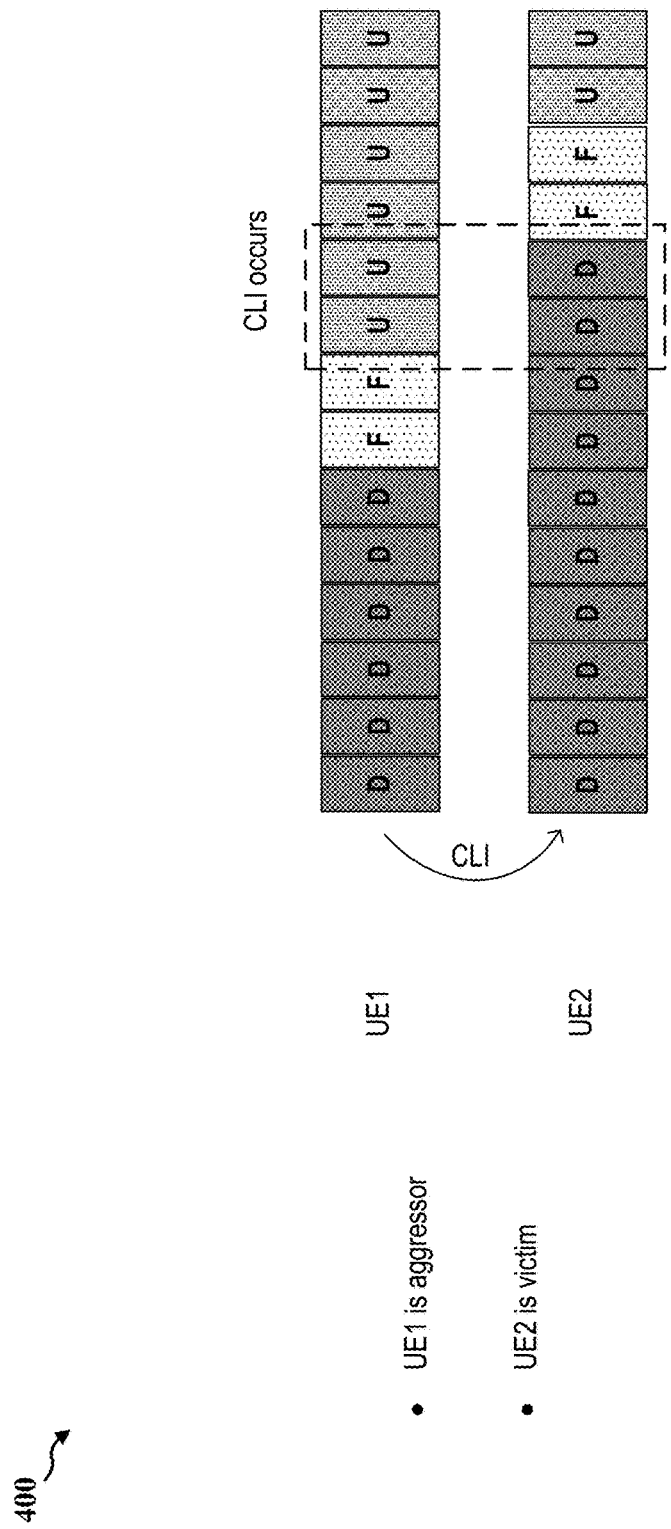
FIG. 4 is a diagram of an example of cross-link interference (CLI) between slots of two UEs, in accordance with various aspects of the present disclosure.

Referring to FIG. 4, diagram 400 includes an example of CLI between slots of two UEs. For example, UE1 may correspond to an aggressor while UE2 corresponds to a victim. In an aspect, UE1 and UE2 may have different UL and DL slot formats, and UE2 may receive UL transmissions from UE1 within a UL symbol (i.e., interfering symbol) of the aggressor UE1 colliding with a DL symbol of victim UE2. This CLI may be caused by any UL transmission from aggressor UE1 including PUCCH, PUSCH, RACH preamble, and SRS. Measurement of the CLI may be configured at the victim UE2 for interference management. In Release 16, Layer 3 measurement and reporting mechanisms for CLI may be sounding reference signal (SRS)-reference signals received power (RSRP) based on the configured SRS measurement resource and CLI RSSI based on the configured CLI RSSI measurement resource. The measurement resource configuration may include periodicity, frequency RBs and OFDM symbols where the CLI is measured.

Referring to FIG. 5, diagram 500 includes an example of CLI between two UEs configured in a single cell or different cells. For example, diagram 500 illustrates the relationship between aggressor UE1 and victim UE2 slots.

In an aspect, a timing difference may exist between UE1 and UE2 due to various propagation delays. A UE capability determines whether victim UE2 may receive DL serving cell signals/channels and measure CLI resource in the same symbol. The victim UE2 may not know the aggressor TDD UL/DL configuration (i.e., slot formats) or SRS transmission configuration. In order to measure the CLI, victim UE2 utilizes the CLI measurement resource configuration of the network. Victim UE2 is not aware of the identity of aggressor UE1 associated with each configured CLI measurement resource. The network configures the LCI measurement resource to match the TDD UL/DL configuration or SRS transmission configuration of aggressor UE1. As depicted in scenario 502, CLI may occur between UE1 and UE2 within different cells. In another example, in scenario 504, CLI may occur between UE1 and UE2 within the same cell.

FIG. 6 is a diagram 600 illustrating a staggering pattern per comb size and a number of symbols. For example, the CLI measurement metric may correspond to at least one of SRS-RSRP or CLI RSSI.

In an aspect, the SRS-RSRP of the victim UE is the linear average of the power contributions of the SRS to be measured over the configured resource elements within the considered measurement frequency bandwidth in the time resources in the configured measurement occasions. The CLI SRS measurement resource configuration of the victim UE supports measurement of the SRS for aggressor UE UL channel sounding with configurations, including transmission comb (transmissionComb), comb offset (comboffset), cyclicShift, repetitionFactor, and number of symbols (nrofSymbols). The transmissionComb indicates that the SRS is transmitted on every nth RE. The comboffset indicates the starting RE in the RB. The cyclicShift indicates the phase rotation applied to SRS sequence across REs. The repetitionFactor indicates the SRS is repeated in time domain to enhance the signal to noise ratio. The nrofSymbols indicates the number of consecutive SRS OFDM symbols. Further details of the transmissionComb for a conventional CLI SRS measurement resource configuration includes:

| | | |
|---|---|---|
| transmissionComb | | n2 comboffset (0, 1), cyclicShift (0, . . . , 7) n4 comboffset (0, . . . , 3), cyclicShift (0, . . . , 11) |
| resourceMapping | OFDM symbol location of the SRS-RSRP measurement resource within a slot. The configured SRS-RSRP measurement resource does not exceed the slot boundary. StartPosition (SRSSymbolStartPosition = 0 . . . 5; "0" refers to the last symbol, "1" refers to the second last symbol) Number of OFDM symbols (N = 1, 2 or 4 per SRS-RSRP measurement resource) RepetitionFactor (r = 1, 2 or 4) (see TS 38.214 [19], clause 6.2.1 and TS 38.211 [16], clause 6.4.1.4). | StartPosition INTEGER (0, . . . , 5) nrofSymbols ENUMERATED {n1, n2, n4} repetitionFactor ENUMERATED {n1, n2, n4} |
| sequenceID | Sequence ID used to initialize pseudo random group and sequence hopping | 0, . . . , 1023 |

In an aspect, a CLI SRS-RSRP measurement resource being configured to be staggered in frequency based on one of the patterns per comb size and number of symbols:

| Comb size | Number of symbols | | | | |
|---|---|---|---|---|---|
| | 1 | 2 | 4 | 8 | 12 |
| 2 | {0} | {0, 1} | {0, 1, 0, 1} | N/A | N/A |
| 4 | N/A | {0, 2} | {0, 2, 1, 3} | {0, 2, 1, 3, 0, 2, 1, 3} | {0, 2, 1, 3, 0, 2, 1, 3, 0, 2, 1, 3} |
| 8 | N/A | N/A | {0, 4, 2, 6} | {0, 4, 2, 6, 1, 5, 3, 7} | {0, 4, 2, 6, 1, 5, 3, 7, 0, 4, 2, 6} |

Referring to FIG. 7, an example of a method 700 for wireless communication at a UE, such as, UE 104 can be performed using one or more of the components of UE 104 described in FIGS. 1, 2, 3, and 9.

At block 702, the method 700 includes receiving, by a first UE from a network entity, a SRS configuration. In an aspect, the communicating component 342, e.g., in conjunction with processor(s) 312, memory 316, and/or transceiver 302, may be configured to receive, by a first UE from a network entity, a SRS configuration. Thus, the UE 104, the processor(s) 312, and/or the communicating component 342 may define the means for receiving, by a first UE from a network entity, a SRS configuration.

At block 704, the method 700 includes measuring, by the first UE, CLI between the first UE and a second UE based on the SRS configuration. In an aspect, the communicating component 342, e.g., in conjunction with processor(s) 312, memory 316, and/or transceiver 302, may be configured to measure, by the first UE, CLI between the first UE and a second UE based on the SRS configuration. Thus, the UE 104, the processor(s) 312, and/or the communicating component 342 may define the means for measuring, by the first UE, CLI between the first UE and a second UE based on the SRS configuration.

At block 706, the method 700 includes transmitting, by the first UE to the network entity, a measurement report of the CLI measurement to trigger CLI management between the first UE and the second UE. In an aspect, the communicating component 342, e.g., in conjunction with processor(s) 312, memory 316, and/or transceiver 302, may be configured to transmit, by the first UE to the network entity, a measurement report of the CLI measurement to trigger CLI management between the first UE and the second UE. Thus, the UE 104, the processor(s) 312, and/or the communicating component 342 may define the means for transmitting, by the first UE to the network entity, a measurement report of the CLI measurement to trigger CLI management between the first UE and the second UE.

In some aspects of method 700, the CLI corresponds to a downlink symbol of the first UE colliding with one or more uplink transmissions from an uplink symbol of the second UE.

In some aspects of method 700, CLI occurs between the first UE and the second UE in either a same cell or different cells.

In some aspects of method 700, the CLI measurement corresponds to at least one of a SRS-RSRP and a CLI RSSI.

In some aspects of method 700, the SRS-RSRP corresponds to a linear average of power contributions of the SRS to be measured over one or more configured resource elements within a considered measurement frequency bandwidth in a time resource in one or more configured measurement occasions.

In some aspects of method 700, the SRS configuration enables the UE to receive and demodulate an enhanced SRS in a receiver processor of the UE.

In some aspects of method 700, measuring the CLI between the first UE and second UE includes measuring a CLI SRS-RSRP measurement resource configured in any orthogonal frequency-division multiplexing (OFDM) symbol of a slot.

In some aspects of method 700, measuring the CLI between the first UE and second UE includes measuring a plurality of symbols per CLI SRS-RSRP measurement resource.

In some aspects of method 700, measuring the CLI between the first UE and second UE includes measuring a comb size 8 for frequency domain mapping for a CLI SRS-RSRP measurement resource.

In some aspects of method 700, measuring the CLI between the first UE and second UE includes measuring additional sequence identifiers (IDs) defined for one or more corresponding CLI SRS-RSRP measurement resources.

In some aspects of method 700, measuring the CLI between the first UE and second UE includes measuring a CLI SRS-RSRP measurement resource with multiple symbols in a slot is configured with staggered frequency.

In some aspects of method 700, measuring the CLI between the first UE and second UE includes measuring a CLI SRS-RSRP measurement resource configured to repeat across multiple slots.

In some aspects of method 700, measuring the CLI between the first UE and second UE includes measuring a sequence for a CLI SRS-RSRP measurement resource based on one or more sequence generation parameters or a mapping of a the one or more sequence generation parameters across one or more orthogonal frequency-division multiplexing (OFDM) symbols of a SRS resource or a sequence different than the Zadoff-Chu sequence.

In some aspects of method 700, measuring the CLI between the first UE and second UE includes a comb size eight and a cyclic shift configured to a CLI SRS-RSRP measurement resource.

In some aspects of method 700, measuring the CLI between the first UE and second UE includes a starting orthogonal frequency-division multiplexing (OFDM) symbol location configured for CLI SRS-RSRP measurement resource within a slot.

In some aspects of method 700, measuring the CLI between the first UE and second UE includes measuring a plurality of orthogonal frequency-division multiplexing (OFDM) symbols configured within a slot per CLI SRS-RSRP measurement resource.

In some aspects of method 700, measuring the CLI between the first UE and second UE includes measuring a plurality of sequence identifiers (IDs) configured for one or more corresponding CLI SRS-RSRP measurement resources.

In some aspects of method 700, measuring the CLI between the first UE and second UE includes measuring a CLI SRS-RSRP measurement resource configured with a staggered frequency based on a staggering pattern corresponds to a comb size and a number of symbols.

In some aspects of method 700, the staggering pattern further corresponds to a comb offset.

In some aspects, method 700 may include transmitting, by the UE to the network entity, a capability report indicating whether the UE supports reception of a CLI SRS-RSRP measurement resource by receiving and demodulating the enhanced SRS with one or more additional configurations.

In some aspects of method 700, the capability report further includes individual fields for each of the one or more additional configurations.

Referring to FIG. 8, an example of a method 800 for wireless communication at a base station, such as, base station 102 can be performed using one or more of the components of base station 102 described in FIGS. 1, 2, 3, and 9.

At block 802, the method 800 includes transmitting, by a network entity to a first UE, a SRS configuration. In an aspect, the communicating component 242, e.g., in conjunction with processor(s) 212, memory 216, and/or transceiver 202, may be configured to transmit, by a network entity to a first UE, a SRS configuration. Thus, the base station 102, the processor(s) 212, and/or the communicating component 242 may define the means for transmitting, by a network entity to a first UE, a SRS configuration.

At block 804, the method 800 includes receiving, by the network entity from the first UE, a measurement report of the CLI measurement between the first UE and a second UE. In an aspect, the communicating component 242, e.g., in conjunction with processor(s) 212, memory 216, and/or transceiver 202, may be configured to receive, by the network entity from the first UE, a measurement report of the CLI measurement between the first UE and a second UE. Thus, the base station 102, the processor(s) 212, and/or the communicating component 242 may define the means for receiving, by the network entity from the first UE, a measurement report of the CLI measurement between the first UE and a second UE.

At block 806, the method 800 includes performing, by the network entity, CLI management between the first UE and the second UE based on the CLI measurement. In an aspect, the communicating component 242, e.g., in conjunction with processor(s) 212, memory 216, and/or transceiver 202, may be configured to perform, by the network entity, CLI management between the first UE and the second UE based on the CLI measurement. Thus, the base station 102, the processor(s) 212, and/or the communicating component 242 may define the means for performing, by the network entity, CLI management between the first UE and the second UE based on the CLI measurement.

In some aspects of method 800, the CLI occurs in downlink symbols of the first UE colliding with one or more uplink transmissions from an uplink symbol of the second UE.

In some aspects of method 800, the CLI occurs between the first UE and the second UE in either a same cell or different cells.

In some aspects of method 800, the CLI measurement corresponds to at least one of a SRS-RSRP and a CLI RSSI.

In some aspects of method 800, the SRS-RSRP corresponds to a linear average of power contributions of the SRS to be measured over one or more configured resource elements within a considered measurement frequency bandwidth in a time resource in one or more configured measurement occasions.

In some aspects of method 800, the SRS configuration enables the UE to receive and demodulate an enhanced SRS in a receiver processor of the UE.

In some aspects, method 800 may include receiving, from the network entity, a capability report indicating whether the UE supports reception of a CLI SRS-RSRP measurement resource by receiving and demodulating the enhanced SRS with one or more additional configurations.

Figure 9:
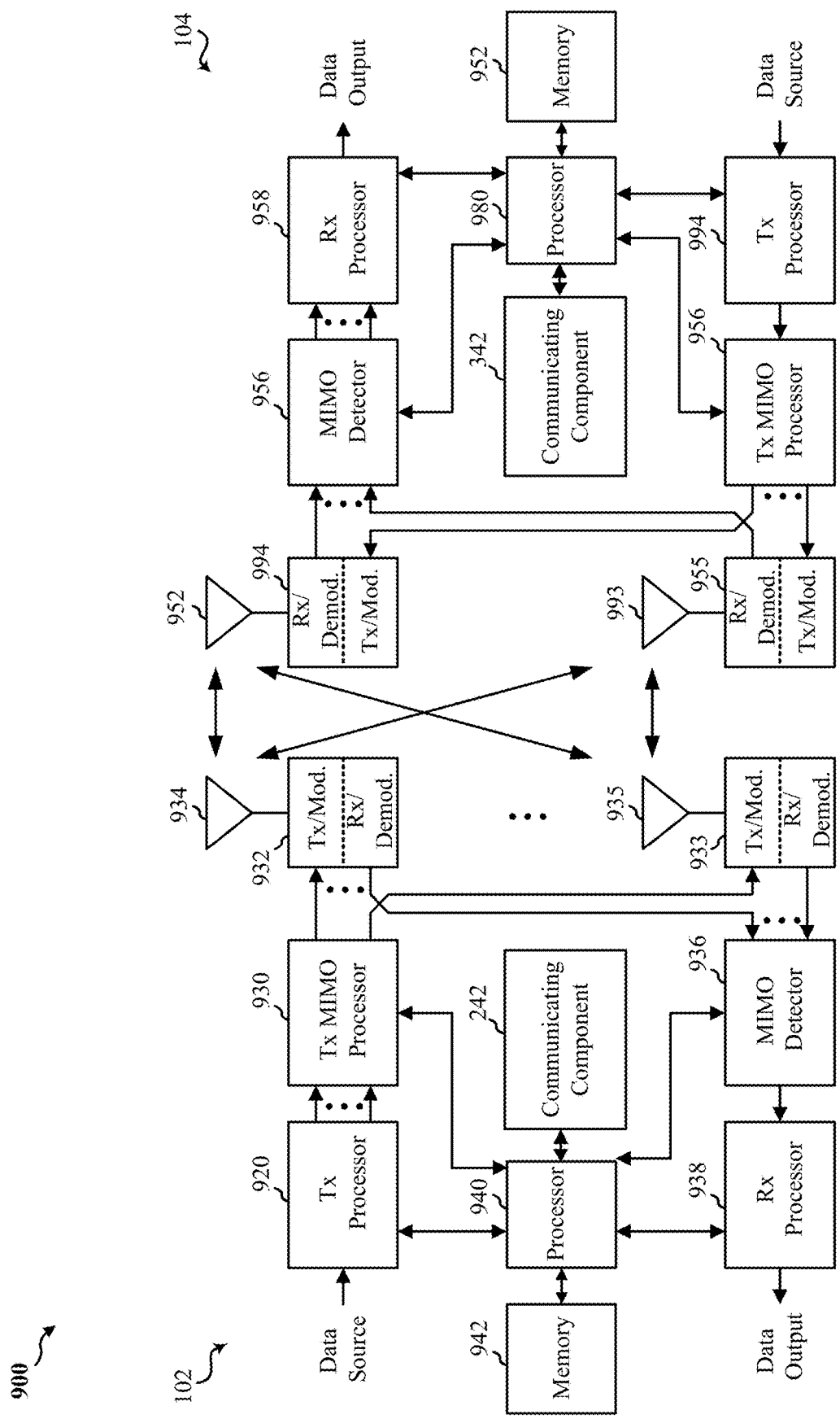
FIG. 9 is a block diagram illustrating an example of a MIMO communication system including a base station and a UE, in accordance with various aspects of the present disclosure.

Referring to FIG. 9, an example of a MIMO communication system 900 includes base station 102, which may be acting as an IAB node or a parent node, and UE 104. The base station 102 and UE 104 may be the same as described above, and may include additional components as described with reference to FIG. 9. The MIMO communication system 900 may illustrate an aspect of the wireless communication access network 100 described with reference to FIG. 1. The base station 102 may be equipped with antennas 934 and 935, and the UE 104 may be equipped with antennas 952 and 953. In the MIMO communication system 900, the base station 102 may be able to send data over multiple communication links at the same time. Each communication link may be called a "layer" and the "rank" of the communication link may indicate the number of layers used for communication. For example, in a 2×2 MIMO communication system where base station 102 transmits two "layers," the rank of the communication link between the base station 102 and the UE 104 is two.

At the base station 102, a transmit (Tx) processor 920 may receive data from a data source. The transmit processor 920 may process the data. The transmit processor 920 may also generate control symbols or reference symbols. A transmit MIMO processor 930 may perform spatial processing (e.g., precoding) on data symbols, control symbols, or reference symbols, if applicable, and may provide output symbol streams to the transmit modulator/demodulators 932 and 933. Each modulator/demodulator 932 through 933 may process a respective output symbol stream (e.g., for OFDM, etc.) to obtain an output sample stream. Each modulator/demodulator 932 through 933 may further process (e.g., convert to analog, amplify, filter, and upconvert) the output sample stream to obtain a DL signal. In one example, DL signals from modulator/demodulators 932 and 933 may be transmitted via the antennas 934 and 935, respectively.

At the UE 104, the UE antennas 952 and 953 may receive the DL signals from the base station 102 and may provide the received signals to the modulator/demodulators 954 and 955, respectively. Each modulator/demodulator 954 through 955 may condition (e.g., filter, amplify, downconvert, and digitize) a respective received signal to obtain input samples. Each modulator/demodulator 954 through 955 may further process the input samples (e.g., for OFDM, etc.) to obtain received symbols. A MIMO detector 956 may obtain received symbols from the modulator/demodulators 954 and 955, perform MIMO detection on the received symbols, if applicable, and provide detected symbols. A receive (Rx) processor 958 may process (e.g., demodulate, deinterleave, and decode) the detected symbols, providing decoded data for the UE 104 to a data output, and provide decoded control information to a processor 980, or memory 982.

The processor 9 940 may in some cases execute stored instructions to instantiate a communicating component 242 (see e.g., FIGS. 1 and 2). The processor 980 may in some cases execute stored instructions to instantiate a communicating component 342 (see e.g., FIGS. 1 and 3).

On the uplink (UL), at the UE 104, a transmit processor 964 may receive and process data from a data source. The transmit processor 964 may also generate reference symbols for a reference signal. The symbols from the transmit processor 964 may be precoded by a transmit MIMO processor 966 if applicable, further processed by the modulator/demodulators 954 and 955 (e.g., for SC-FDMA, etc.), and be transmitted to the base station 102 in accordance with the communication parameters received from the base station 102. At the base station 102, the UL signals from the UE 94 may be received by the antennas 934 and 935, processed by the modulator/demodulators 932 and 933, detected by a MIMO detector 936 if applicable, and further processed by a receive processor 938. The receive processor 938 may provide decoded data to a data output and to the processor 940 or memory 942.

The components of the UE 104 may, individually or collectively, be implemented with one or more ASICs adapted to perform some or all of the applicable functions in hardware. Each of the noted modules may be a means for performing one or more functions related to operation of the MIMO communication system 1000. Similarly, the components of the base station 102 may, individually or collectively, be implemented with one or more ASICs adapted to perform some or all of the applicable functions in hardware. Each of the noted components may be a means for performing one or more functions related to operation of the MIMO communication system 900.

The above detailed description set forth above in connection with the appended drawings describes examples and does not represent the only examples that may be implemented or that are within the scope of the claims. The term "example," when used in this description, means "serving as an example, instance, or illustration," and not "preferred" or "advantageous over other examples." The detailed description includes specific details for the purpose of providing an understanding of the described techniques. These techniques, however, may be practiced without these specific details. In some instances, well-known structures and apparatuses are shown in block diagram form in order to avoid obscuring the concepts of the described examples.

Information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, computer-executable code or instructions stored on a computer-readable medium, or any combination thereof.

The various illustrative blocks and components described in connection with the disclosure herein may be implemented or performed with a specially-programmed device, such as but not limited to a processor, a digital signal processor (DSP), an ASIC, a FPGA or other programmable logic device, a discrete gate or transistor logic, a discrete hardware component, or any combination thereof designed to perform the functions described herein. A specially-programmed processor may be a microprocessor, but in the alternative, the processor may be any conventional processor, controller, microcontroller, or state machine. A specially-programmed processor may also be implemented as a combination of computing devices, e.g., a combination of a DSP and a microprocessor, multiple microprocessors, one or more microprocessors in conjunction with a DSP core, or any other such configuration.

The functions described herein may be implemented in hardware, software, or any combination thereof. If implemented in software executed by a processor, the functions may be stored on or transmitted over as one or more instructions or code on a non-transitory computer-readable medium. Other examples and implementations are within the scope and spirit of the disclosure and appended claims. For example, due to the nature of software, functions described above can be implemented using software executed by a specially programmed processor, hardware, hardwiring, or combinations of any of these. Features implementing functions may also be physically located at various positions, including being distributed such that portions of functions are implemented at different physical locations. Moreover, the term "or" is intended to mean an inclusive "or" rather than an exclusive "or." That is, unless specified otherwise, or clear from the context, the phrase, for example, "X employs A or B" is intended to mean any of the natural inclusive permutations. That is, for example the phrase "X employs A or B" is satisfied by any of the following instances: X employs A; X employs B; or X employs both A and B. Also, as used herein, including in the claims, "or" as used in a list of items prefaced by "at least one of" indicates a disjunctive list such that, for example, a list of "at least one of A, B, or C" means A or B or C or AB or AC or BC or ABC (A and B and C).

Computer-readable media includes both computer storage media and communication media including any medium that facilitates transfer of a computer program from one place to another. A storage medium may be any available medium that can be accessed by a general purpose or special purpose computer. By way of example, and not limitation, computer-readable media can comprise RAM, ROM, EEPROM, CD-ROM or other optical disk storage, magnetic disk storage or other magnetic storage devices, or any other medium that can be used to carry or store desired program code means in the form of instructions or data structures and that can be accessed by a general-purpose or special-purpose computer, or a general-purpose or special-purpose processor. Also, any connection is properly termed a computer-readable medium. For example, if the software is transmitted from a web site, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, include compact disc (CD), laser disc, optical disc, digital versatile disc (DVD), floppy disk and Blu-ray disc where disks usually reproduce data magnetically, while discs reproduce data optically with lasers. Combinations of the above are also included within the scope of computer-readable media.

The previous description of the disclosure is provided to enable a person skilled in the art to make or use the disclosure. Various modifications to the disclosure will be readily apparent to those skilled in the art, and the common principles defined herein may be applied to other variations without departing from the spirit or scope of the disclosure. Furthermore, although elements of the described aspects and/or embodiments may be described or claimed in the singular, the plural is contemplated unless limitation to the singular is explicitly stated. Additionally, all or a portion of any aspect and/or embodiment may be utilized with all or a portion of any other aspect and/or embodiment, unless stated otherwise. Thus, the disclosure is not to be limited to the examples and designs described herein but is to be accorded the widest scope consistent with the principles and novel features disclosed herein.

What is claimed is:

1. A first user equipment (UE) for wireless communication, comprising:
   a transceiver;
   a memory; and
   one or more processors communicatively coupled to the transceiver and the memory, wherein the one or more processors are configured to:
      receive, from a network entity via the transceiver, a sounding reference signal (SRS) configuration, wherein the SRS configuration includes information indicative of a cross-link interference (CLI) SRS-reference signal received power (RSRP) measurement resource;
      measure CLI between the first UE and a second UE based on the SRS configuration to generate a CLI measurement, wherein to measure the CLI between the first UE and the second UE, the one or more processors are configured to measure more than four symbols per CLI SRS-RSRP measurement resource; and
      transmit, to the network entity via the transceiver, a measurement report based on the CLI measurement to trigger CLI management between the first UE and the second UE.

2. The first UE of claim 1, wherein the CLI corresponds to a collision between a downlink symbol of a first slot the first UE is using to communicate and one or more uplink transmissions within an uplink symbol of a second slot the second UE is using to communicate.

3. The first UE of claim 1, wherein the CLI between the first UE and the second UE is in either a same cell or different cells.

4. The first UE of claim 1, wherein the CLI measurement corresponds to at least one of a SRS RSRP or a CLI received signal strength indicator (RSSI).

5. The first UE of claim 4, wherein the SRS-RSRP corresponds to a linear average of power contributions of an SRS to be measured over one or more configured resource elements within a considered measurement frequency bandwidth in a time resource in one or more configured measurement occasions.

6. The first UE of claim 4, wherein the SRS configuration enables the first UE to receive and demodulate an enhanced SRS in a receiver processor of the first UE.

7. The first UE of claim 4, wherein to measure the CLI between the first UE and the second UE, the one or more processors are configured to measure the CLI SRS-RSRP measurement resource configured in any orthogonal frequency-division multiplexing (OFDM) symbol of a slot.

8. The first UE of claim 4, wherein to measure the CLI between the first UE and the second UE, the one or more processors are configured to measure a sequence for the CLI SRS-RSRP measurement resource based on one or more Zadoff-Chu sequences configured via one more sequence generation parameters.

9. The first UE of claim 4, wherein to measure the CLI between the first UE and the second UE, the one or more processors are configured to measure more than 1024 sequence identifiers (IDs) defined for one or more corresponding CLI SRS-RSRP measurement resources.

10. The first UE of claim 4, wherein to measure the CLI between the first UE and the second UE, the one or more processors are configured to measure the CLI SRS-RSRP measurement resource with multiple symbols in a slot that are staggered in frequency.

11. The first UE of claim 4, wherein to measure the CLI between the first UE and the second UE, the one or more processors are configured measure the CLI SRS-RSRP measurement resource configured to repeat across multiple slots.

12. The first UE of claim 4, wherein the SRS configuration includes information indicative of a cyclic shift configured for the CLI SRS-RSRP measurement resource, and wherein to measure the CLI between the first UE and the second UE, the one or more processors are configured to measure a comb size 8 and the cyclic shift configured for the CLI SRS-RSRP measurement resource.

13. The first UE of claim 4, wherein to measure the CLI between the first UE and the second UE, the one or more processors are configured to measure a starting orthogonal frequency-division multiplexing (OFDM) symbol location configured for the CLI SRS-RSRP measurement resource within a slot.

14. The first UE of claim 4, wherein to measure the CLI between the first UE and the second UE, the one or more processors are configured to measure 8 or 12 orthogonal frequency-division multiplexing (OFDM) symbols configured within a slot per the CLI SRS-RSRP measurement resource.

15. The first UE of claim 4, wherein to measure the CLI between the first UE and the second UE, the one or more processors are configured to measure a plurality of sequence identifiers (IDs) configured for one or more corresponding CLI SRS-RSRP measurement resources, wherein a maximum value of the sequence ID is 65535.

16. The first UE of claim 4, wherein to measure the CLI between the first UE and the second UE, the one or more processors are configured to measure the CLI SRS-RSRP measurement resource configured with a staggered frequency based on a staggering pattern that corresponds to a comb size and a number of symbols.

17. The first UE of claim 16, wherein the staggering pattern further corresponds to a comb offset.

18. The first UE of claim 1, wherein the one or more processors are configured to transmit, to the network entity via the transceiver, a capability report indicating whether the first UE supports reception of the CLI SRS-RSRP measurement resource.

19. The first UE of claim 18, wherein the capability report further includes individual fields for each of one or more additional configurations.

20. The first UE of claim 1, wherein the SRS configuration further includes information indicative of a comb size 8 for frequency domain mapping for the CLI SRS-RSRP measurement resource.

21. A network entity wireless communication, comprising:
   a transceiver;
   a memory; and
   one or more processors communicatively coupled to the transceiver and the memory, wherein the one or more processors are configured to:
      transmit, to a first user equipment (UE), a sounding reference signal (SRS) configuration, wherein the SRS configuration includes information indicative of a cross-link interference (CLI) SRS-reference signal received power (RSRP) measurement resource;
      receive, from the first UE, a measurement report of a CLI measurement based on CLI measured between the first UE and a second UE based on the SRS configuration, wherein the measurement report includes a measurement of more than four symbols per CLI SRS-RSRP measurement resource; and perform CLI management between the first UE and the second UE based on the CLI measurement.

22. The network entity of claim 21, wherein the CLI occurs in a downlink symbol of the first UE colliding with one or more uplink transmissions from an uplink symbol of the second UE.

23. The network entity of claim 21, wherein the CLI occurs between the first UE and the second UE in either a same cell or different cells.

24. The network entity of claim 21, wherein the CLI measurement corresponds to at least one of a SRS and a CLI received signal strength indicator (RSSI).

25. The network entity of claim 24, wherein the SRS-RSRP corresponds to a linear average of power contributions of an SRS to be measured over one or more configured resource elements within a considered measurement frequency bandwidth in a time resource in one or more configured measurement occasions.

26. The network entity of claim 24, wherein the SRS configuration enables the first UE to receive and demodulate an enhanced SRS in a receiver processor of the first UE.

27. The network entity of claim 21, wherein the one or more processors are configured to receive, from the first UE, a capability report indicating whether the first UE supports reception of the CLI SRS-RSRP measurement resource.

28. The network entity of claim 21, wherein the measurement report includes the measurement of 8 or 12 orthogonal frequency-division multiplexing (OFDM) symbols configured within a slot per the CLI SRS-RSRP measurement resource.

29. A method of wireless communication performed by an apparatus, comprising:

receiving, from a network entity, a sounding reference signal (SRS) configuration, wherein the SRS configuration includes information indicative of a cross-link interference (CLI) SRS-reference signal received power (RSRP) measurement resource;

measuring CLI between a first UE and a second UE based on the SRS configuration to generate a CLI measurement, wherein measuring the CLI between the first UE and the second UE comprises measuring more than four symbols per CLI SRS-RSRP measurement resource; and transmitting, to the network entity, a measurement report of the CLI measurement to trigger CLI management between the first UE and the second UE.

30. A method of wireless communication performed by an apparatus, comprising:

transmitting, to a first user equipment (UE), a sounding reference signal (SRS) configuration, wherein the SRS configuration includes information indicative of a cross-link interference (CLI) SRS-reference signal received power (RSRP) measurement resource;

receiving, from the first UE, a measurement report of a CLI measurement based on CLI measured between the first UE and a second UE based on the SRS configuration, wherein the measurement report includes a measurement of more than four symbols per CLI SRS-RSRP measurement resource; and performing CLI management between the first UE and the second UE based on the CLI measurement.

\* \* \* \* \*